United States Patent [19]

Holmes

[11] E Re. 31,264

[45] Reissued Jun. 7, 1983

[54] PLASTIC COIN HOLDER

[75] Inventor: Gordon W. Holmes, Mississauga, Canada

[73] Assignee: Professional Packaging Limited, Mississauga, Canada

[21] Appl. No.: 161,122

[22] Filed: Jun. 19, 1980

Related U.S. Patent Documents

Reissue of:

[64] Patent No.: 4,095,608
Issued: Jun. 20, 1978
Appl. No.: 733,916
Filed: Oct. 19, 1976

[30] Foreign Application Priority Data

Oct. 22, 1975 [GB] United Kingdom ..... 43455/75

[51] Int. Cl.[3] ..... G07D 9/00
[52] U.S. Cl. ..... 133/1 A; 206/0.82
[58] Field of Search ..... 206/0.82, 0.84; 133/1 A, 1 R, 8 R, 8 A, 8 B, 8 D; 132/33, 37, 40, 41, 36.2

[56] References Cited

U.S. PATENT DOCUMENTS

| | | | |
|---|---|---|---|
| 209,585 | 11/1878 | Raymond et al. | 206/0.82 |
| 522,311 | 7/1894 | Armitage | 205/0.82 |
| 734,806 | 7/1903 | Bowen | 206/0.82 |
| 852,574 | 5/1907 | Norrington | 133/1 A |
| 1,076,400 | 10/1913 | Wilton | 206/0.82 |
| 1,145,743 | 7/1915 | Bradford | 206/0.82 |
| 2,652,839 | 9/1953 | Leclabart | 132/36.2 |
| 3,606,008 | 9/1971 | Lusetti | 206/0.84 |
| 3,710,544 | 1/1973 | Lamming | 133/1 R |
| 4,049,115 | 9/1977 | Pasbrig | 206/0.84 |

FOREIGN PATENT DOCUMENTS

| | | | |
|---|---|---|---|
| 636290 | 10/1936 | Fed. Rep. of Germany . | |
| 807033 | 6/1951 | Fed. Rep. of Germany . | |
| 1429170 | 1/1966 | France | 133/1 A |
| 100670 | 8/1949 | New Zealand . | |
| 111772 | 8/1955 | New Zealand . | |
| 116629 | 6/1956 | New Zealand . | |

*Primary Examiner*—Stanley H. Tollberg
*Attorney, Agent, or Firm*—Sim & McBurney

[57] ABSTRACT

A coin holder useful for the packaging and dispensing of predetermined numbers of coins has a generally C-shaped cross section elongate body and lips at the mouth of the body. End closures are provided defining a C-shaped opening in the end of the body of radius less than the body radius. The coin holder is flexible and constructed of plastic material.

9 Claims, 5 Drawing Figures

FIG. 1
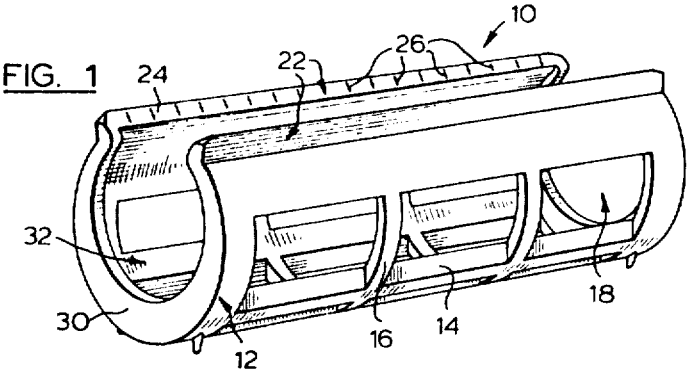
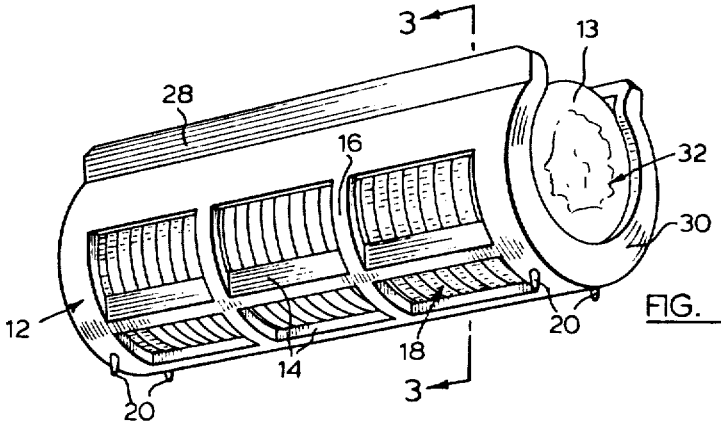
FIG. 2
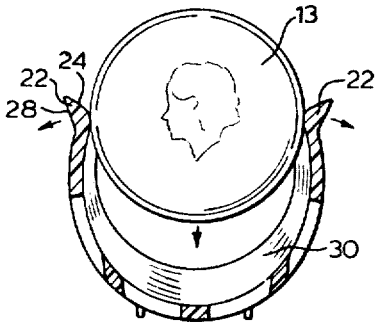
FIG. 3
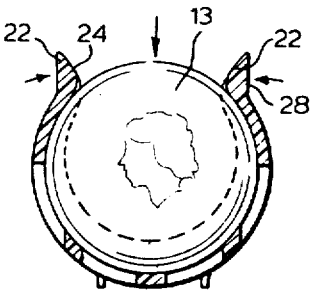
FIG. 4

PLASTIC COIN HOLDER

Matter enclosed in heavy brackets [ ] appears in the original patent but forms no part of this reissue specification; matter printed in italics indicates the additions made by reissue.

FIELD OF INVENTION

This invention relates to a holder for disc-like objects, such as coins, tokens and the like.

BACKGROUND TO THE INVENTION

In the handling, distribution and banking of coins, coins are packaged according to specific established numbers, depending on the denomination of the coins. The most common means of packaging the coins is a paper wrapper which is applied around a cylinder of the coins by hand or by automatic machine, the ends of the wrapper being folded over to retain the coins in place. Spiral-wound paper tubes also are used and provide a more rigid carrier although the open ends of the tube require to be crimped or beaded to retain the coins in place. Since the package provided in this manner is opaque, external printing is required to identify the contents.

This prior art packaging procedure suffers from many disadvantages which are currently tolerated for lack of a viable and inexpensive alternative.

It is customary for the larger financial institutions to wrap coins automatically with the traditional number of coins and distribute the roll packages to retailers and other coin users. Retailers usually check the count of the coins upon opening the roll to ensure the correct number is present. Discrepancies of one or more coins short or over are often found as a result of the ability of the paper wrapper readily to adjust to incorrect number of coins and the only recourse is to double check the number, a time consuming and tedious operation. Further, when the paper tube type package is used, it is not uncommon for the tube to be disposed of with a coin or coins still positioned in the tube, the lack of detection of this coin arising from its light weight character.

Dexterity and skill are required to wrap coins manually in the paper wrappers and many people find it impossible or extremely difficult to form the wrapped cylinders of coins. This is especially true of older persons and young people. When coins are not properly wrapped and the ends sealed, coins can fall out, leading to considerable aggrevation, and time and material wastage.

Hand counted coin packages often have improper numbers, especially where higher number of coins are involved, leading to the necessity for a bank receiving such rolls to double check the numbers before crediting the customer.

Further, due to the opaque nature of the rolls and hence the lack of ability to visually observe the contents without breaking open the roll, there is a considerable opportunity to substitute worthless slugs, cheaper coins or foreign coins in a roll of coins, which, if undetected, leads to an appropriate loss for the bank or other recipient.

The rolls of coins, especially in the form of paper wrapped rolls, are not resistant to rough handling and hence there is a tendency for such rolls to split open or to become unrolled when bags containing them are dropped or roughly handled, leading to the necessity of counting and wrapping the coins anew.

The cylindrical nature of the coin rolls allows them to roll readily on surfaces on which they are positioned, for example, a table, and such rolling may result in the rolls falling onto the floor and breaking open, with consequent problems of collection and reassembly.

When the roll packages are opened to remove the coins therefrom, it is usual to split open the roll in the middle or some other location along its length and then throw the wrapper away. Such wrappers thus are usually used only once.

SUMMARY OF INVENTION

The present invention provides a unique reusable coin holder which overcomes all the prior art problems attendant the paper wrappers. The reusable coin holder preferably is constructed of flexible polymeric material and is capable of being manually or machine loaded with coins, tokens or other disc-like objects.

The coin or other disc-like object holder of the present invention includes an elongate body having a generally C-shaped cross section and a radius of curvature substantially equal to the radius of the disc-like objects. The holder has an end wall integral with the body at each end thereof. The end walls define a generally C-shaped opening in the ends of the body of smaller radius of curvature than the radius of curvature of the body. The holder is capable of limited flexure about its axis to allow for insertion and removal of the disc-like objects through the curvilinear extremities of the body by expansion of the linear distance between the curvilinear extremities beyond the diameter of the disc-like object.

BRIEF DESCRIPTION OF DRAWINGS

FIG. 1 is a perspective view of a coin holder provided in accordance with one embodiment of the invention and empty of coins;

FIG. 2 is another perspective view of the coin holder of FIG. 1 filled with coins;

FIG. 3 is a sectional view taken on lin 3—3 of FIG. 2 illustrating the entry of a coin into the coin holder of FIGS. 1 and 2;

FIG. 4 is the same sectional view as FIG. 3 showing the coin positioned in the holder.

DESCRIPTION OF PREFERRED EMBODIMENT

Figure 5:
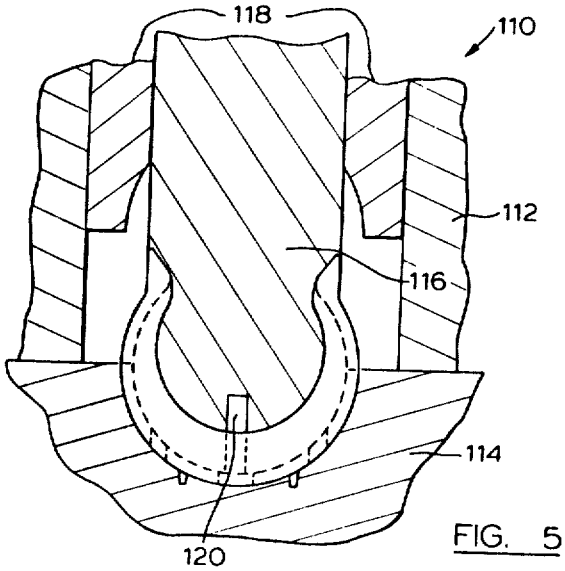
FIG. 5 is a schematic end view of a mold used to form the coin holder of FIG. 1.

Referring to the drawings, a coin holder 10 has an elongate body 12 which has a generally C-shaped cross-section. The body 12 is formed with a radius of curvature which is the radius of curvature of the coins 13 to be packaged therein.

A plurality of longitudinal ribs 14 and a plurality of radial ribs 16 interconnect in the body to define the latticework and rectangular openings 18 in the body.

A pair of projections 20 is provided adjacent each end of the body 12 opposite the open side thereof to constitute feet for the holder to enable it to stand on a flat surface and prevent the holder from rolling, in contrast to the prior art paper wrapper coin rolls.

A pair of lips 22 is integrally formed with the body 12 and extends longitudinally thereof, one at each curvilinear extremity of the body 12. Each of the lips 22 has a triangular cross section and includes a planar surface 24 which is integral with the inner surface of the body 12.

The planar surfaces 24 are divergent away from the curvilinear extremities of the body 12 and assist in the insertion of the coins into the holder 10 and removal of coins from the holder 10, as will become more apparent below.

One or both of the planar surfaces 24 may be provided with regularly spaced indicia 26, indicating fractions of the total numbers of coins intended to be packaged in the holder 10.

The lips 22 also have a second planar surface 28 which is integral with the outer surface of the body 12. The planar surfaces 28 are parallel to each other and each join with the respective first planar surface 24 at the apex of the triangular cross section of the lips 22.

An end wall 30 integral with the body 12 is provided at each end of the body 12. Each end wall 30 defines a generally C-shaped opening 32 in the ends of the body 12 of smaller radius of curvature than the radius of curvature of the body 12.

Each of the end walls 30 is constructed so that the centres of curvature of the openings 32 lie on a straight line which is parallel to the axis of the body 12 but positioned closer to the lips 22 than the body axis, so that the lateral dimension of the end walls 30 decreases from a maximum adjacent the projections 20 to a minimum adjacent the lips 22.

The end walls 30 are required to prevent coins from exiting the body from the end thereof. However, end walls which totally close the end of the body 12 cannot be used since the holder 10 would be incapable of sufficient opening for insertion of the coins or for removal of a steel core inserted in the mold during molding of the holder. The end walls 30 define the C-shaped opening 32 in the ends of the body.

The end walls 30 provide a considerable spring grip strength to the holder 10 as compared to the body 12 alone, so that coins packaged in the holder 10 are not readily accidentally removed therefrom.

The contouring of the end walls 30 as described above assists in this result. Thus, the thinner portions of the end walls 30 adjacent the lips 22 allow the flexing required to allow coins to enter and leave the holder 10, while the thicker portions adjacent the projection 20 flex very little and exert the tension required to retain the coins within the holder 10. The holder may be handled roughly or dropped without any danger of loss of coins, in contrast to the prior art.

Since the end walls 30 assist in restoring the device to its original shape without fatigue upon insertion of coins into the holder or upon release of coins from the holder, the coin holder is able to be reused many times.

The tapered nature of the end walls 30 also allow the programmed flexing open of the holder 10 as it is removed from an inner mold core during the opening of the mold, as described in more detail below.

The holder 10 is constructed of suitable material, generally suitable polymeric material, to such as polypropylene allow limited flexure of the holder about its axis to allow for the insertion and removal of coins past the lips 22 by expansion of the linear distance between the curvilinear extremities beyond the diameter of the coins.

Coins are packaged in the holder 10, as may be seen from FIGS. 3 and 4, by positioning a coin or a number of coins against the surfaces 24 and exerting pressure on the coin or coins thereby forcing the lips 22 apart to allow the coin or coins to enter the body 12, the body springing back to its rest position once the coin is in the body 12 to grip the coin and entrap it in the structure. The coins may be loaded into the holder manually or by machine.

When the holder 10 is empty or only a few coins are present in the holder, individual coins may be positioned in the holder by inserting the coin side on through the opening and then twisting the coin into position.

The triangular cross sectional shape of the lips 22 adds considerable longitudinal strength to the holder 10 which assists in retaining the coins within the holder.

The indicia 26 eliminate any necessity for hand counting of the partially filled holder. The lips 22 provide a convenient gripping means for assisting in the removal of coins from the holder 10. Thus, the holder 10 may be turned upside down and the tips of the fingers on each hand then can pull outwardly on the planar surfaces 24 to open the mouth of the holder 10. This procedure can be assisted by using the thumbs to push on the latticework of ribs 14 and 16, which is readily collapsible for this purpose. Once coins have been ejected from the holder, release of thumb pressure allows restoration of the latticework to its original position.

The coin holder 10 may be partially filled with coins and one or more coins may be added to the holder from time to time, which is not possible with conventional paper wrappers. This feature allows the coin holder to be used as a savings bank for coins over a period of time, until the coin holder has been completely filled up ready for bank deposit.

The coin holder 10, therefore, may replace loose saving of coins in a receptacle, such as a piggy bank, and eliminates the necessity to sort and count such coins prior to their bank deposit.

A number of such coin holders 10 may be provided for different denomination coins in a storage device, so that saved coins are sorted and stored in a single convenient device.

The holders 10 are constructed to receive only the exact number of coins of the particular denomination. Even allowing for maginally different thicknesses of coins due to wear, the holder 10 is incapable of packaging more coins than intended and the absence of one or more coins is readily detected visually by gaps. The prior art problems associated with incorrect numbers being packaged are thus overcome.

The holder 10 may be color-keyed for different denominations and/or numbers, to assist in facilitating counting and sorting of large shipments of stocks of coinage and to avoid confusion between coins of a similar size.

The holder is rugged and capable of reuse many times before it becomes unsuitable for continued use. This contrasts markedly with the one-time use of paper wrappers.

The holder 10 may be filled quite readily without the dexterity required in the formation of the prior art paper wrapper rolls. The open nature of the body 12 allows ready detection of slugs, foreign coins or improperly sized coins in the holder 10, and the consequent losses and possibilities for fraudulent practices prevalent with the prior art are avoided.

The exterior surface of the holder 10 may be provided with identifying information, for example, the number and denomination of the coins, total value of coins and bank or other source identification. Suitable locations for such information are the external panels adjacent the lips 22.

The shape of the holder 10 with its pair of jaws allows bulk shipment of empty holders with little wasted space and considerably less wasted space than is the case with conventional paper or plastic tubes. The two jaws of one holder project into the body of two adjacent holders in the package, while one jaw of each of the adjacent holders projects into the body of the one holder.

Referring now to FIG. 5, the coin holder 10 may be formed in an injection mold 110, typically constructed of steel, having conventional upper and lower mold parts 112 and 114 and an inner mold core 116. The mold and mold cavity are constructed to provide the open jaws of the holder 10 in an upwardly-facing position with the part line of the mold located below and parallel to the line joining the curvilinear extremities of the body and passing through the axis of the body of the holder.

After injection of the polymer, the mold 110 is opened about the part line to remove the lower mold part 114.Upwardly slidable portions 118 of the upper mold part 112 are slid upward to provide a gap between the upper quadrants of the coin holder 10 and the mold part 112. Knock out pins 120 buried within the inner core 116 then exert a downward force on the holder 10, forcing it to flex open evenly on each side and spring off the inner core 116, thereby releasing the holder 10 from the mold with the minimum of distortion and at high production speed.

SUMMARY

The present invention, therefore, provides a plastic coin holder of unique design which is superior in many respects to conventional coin dispensing and packaging systems. Modifications are possible within the scope of the invention.

What I claim is:

[1. An integrally-formed holder for disc-like objects constructed of flexible polymeric material and comprising:

an elongate body having a C-shaped cross-section and a radius of curvature substantially equal to the radius of said disc-like objects, and a continuous end wall integral with said body at each end thereof, said end walls defining a C-shaped opening in each end of said body of smaller radius of curvature than the radius of curvature of said body and including a central portion and two end portions along the curvilinear length thereof, said C-shaped end openings encompassing the axis of said body within their periphery, said end walls being constructed normally to maintain said radius of curvature of said body substantially equal to the radius of said disc-like objects and to impart a spring grip strength to said body sufficient to hold and entrap said disc-like objects in said holder, whereby disc-like objects are held in snug fit within said body and are prevented from accidental dislodgement from said holder, said end portions of said end walls permitting limited resilient flexure of said holder about the axis of said body to increase the radii of curvature of said body and said end wall openings and to increase the rectilinear distance between the curvilinear extremities of said body beyond the diameter of said disc-like object to permit insertion and removal of the disc-like objects through said curvilinear extremities while said central portion flexes very little during said flexure, said end walls exerting a resilient force on said body during said flexure and said increase of radii of curvature urging said body to assume said radius of curvature substantially equal to the radius of said disc-like objects, whereby, upon release of the force inducing said limited flexure, said end wall resiliency is related by urging said body to said radius of curvature thereof and said radius of curvature of said body is resiliently restored to that substantially equal to the radius of said disc-like objects to achieve said snug fit with said disc-like objects within said body.]

2. The holder of claim [1] *7* including a pair of lips integrally formed with said body and extending longitudinally thereof one at each curvilinear extremity of said body.

3. The holder of claim 2 wherein each of said pair of lips has a substantially planar surface integral with the inner surface of said body, said planar surfaces being divergent away from said curvilinear extremities of said body.

4. The holder of claim 3 wherein each of said pair of lips has a second planar surface integral with the outer surface of said body, said second planar surfaces being parallel to each other and terminating at a line of intersection with said first mentioned planar surfaces.

5. The holder of claim 3 wherein at least one of said planar surfaces bears indicia at uniformly spaced locations therealong.

6. The holder of claim [1] *9* wherein said C-shaped openings defined by said end walls have centres of curvature which lie on a straight line which is parallel to the axis of said body and located closer to said curvilinear extremities of said body than said axis.

7. [The holder of claim 1 wherein] *An integrally-formed holder for disc-like objects constructed of flexible polymeric material and comprising:*

*an elongate body having a C-shaped cross-section and a radius of curvature substantially equal to to the radius of said disc-like objects, and*

*a continuous end wall integral with said body at each end thereof,* said end walls [are] *being* generally crescent-shaped and [have] *having two arms of equal curvilinear length and connected through an integral join, each said end wall arm having* a lateral dimension which *continuously* decreases from a maximum value at [a location remote from said curvilinear extremities of said body] *said integral join* to a minimum value at [said] *the* curvilinear extremities *of said body,*

*said end walls thereby defining a C-shaped opening in each end of said body of smaller radius of curvature than the radius of curvature of said body, said C-shaped end openings encompassing the axis of said body within their periphery.*

8. [The holder of claim 1 wherein] *An integrally-formed holder for disc-like objects constructed of flexible polymeric material and comprising:*

*an elongate body having a C-shaped cross-section and a radius of curvature substantially equal to the radius of said disc-like objects, and*

*a continuous end wall integral with said body at each end thereof, said end walls defining a C-shaped opening in each end of said body of smaller radius of curvature than the radius of curvature of said body and including a central portion and two end portions along the curvilinear length thereof,*

*said C-shaped end openings encompassing the axis of said body within their periphery,*

*said end walls being constructed normally to maintain said radius of curvature of said body substantially equal to the radius of said disc-like objects and to impart a spring grip strength to said body sufficient to hold and entrap said disc-like objects in said holder, whereby disc-like objects are held in snug fit within said body and are prevented from accidental dislodgement from said holder,*

*said end portions of said end walls permitting limited resilient flexure of said holder about the axis of said body to increase the radii of curvature of said body and said end wall openings and to increase the rectilinear distance between the curvilinear extremities of said body beyond the diameter of said disc-like object to permit insertion and removal of the disc-like objects through said curvilinear extremities while said central portion flexes very little during said flexure,*

*said end walls exerting a resilient force on said body during said flexure and said increase of radii of curvature urging said body to assume said radius of curvature substantially equal to the radius of said disc-like objects, whereby, upon release of the force inducing said limited flexure, said end wall resiliency is relaxed by urging said body to said radius of curvature thereof and said radius of curvature of said body is resiliently restored to that substantially equal to the radius of said disc-like objects to achieve said snug fit with said disc-like objects within said body,* said body [is] *being* provided with a plurality of radial ribs and a plurality of longitudinal ribs forming an open latticework and imparting a radial flexibility to said body to assist in ejection of disc-like objects from said holder.

9. [The holder of claim 1 including] *An integrally-formed holder for disc-like objects constructed of flexible polymeric material and comprising:*

*an elongate body having a C-shaped cross-section and a radius of curvature substantially equal to the radius of said disc-like objects, and*

*a continuous end wall integral with said body at each end thereof, said end walls defining a C-shaped opening in each end of said body of smaller radius of curvature than the radius of curvature of said body and including a central portion and two end portions along the curvilinear length thereof,*

*said C-shaped end openings encompassing the axis of said body within their periphery,*

*said end walls being constructed normally to maintain said radius of curvature of said body substantially equal to the radius of said disc-like objects and to impart a spring grip strength to said body sufficient to hold and entrap said disc-like objects in said holder, whereby disc-like objects are held in snug fit within said body and are prevented from accidental dislodgement from said holder,*

*said end portions of said end walls permitting limited resilient flexure of said holder about the axis of said body to increase the radii of curvature of said body and said end wall openings and to increase the rectilinear distance between the curvilinear extremities of said body beyond the diameter of said disc-like object to permit insertion and removal of the disc-like objects through said curvilinear extremities while said central portion flexes very little during said flexure,*

*said end walls exerting a resilient force on said body during said flexure and said increase of radii of curvature urging said body to assume said radius of curvature substantially equal to the radius of said disc-like objects, whereby, upon release of the force inducing said limited flexure, said end wall resiliency is relaxed by urging said body to said radius of curvature thereof and said radius of curvature of said body is resiliently restored to that substantially equal to the radius of said disc-like objects to achieve said snug fit with said disc-like objects within said body,* two pairs of external protrusions located one adjacent each end of said body and opposite to the location of said curvilinear extremities.

10. [The holder of claim 1 including] *An integrally-formed holder for disc-like objects constructed of flexible polymeric material and comprising:*

*an elongate body having a C-shaped cross-section and a radius of curvature substantially equal to the radius of said disc-like objects,* a pair of lips integrally formed with said body and extending longitudinally thereof one at each curvilinear extremity of said body, each of said pair of lips having a substantially planar surface integral with the inner surface of said body, said planar surfaces being divergent away from said curvilinear extremities of said body, each of said pair of lips having a second planar surface integral with the outer surface of said body, said second planar surfaces being parallel to each other and terminating at a line of intersection with said first mentioned planar surfaces, and [wherein] *a continuous end wall integral with said body at each end thereof,* said end walls [are] *being* generally crescent-shaped and [have] *having two arms of equal curvilinear length and connected through an integral join, each said end wall having* a lateral dimension which *continuously* decreases from a maximum value at [a location remote from said lips] *said integral join* to a minimum value at said lips, [and] *said end walls thereby defining a C-shaped opening in each end of said body of smaller radius of curvature than the radius of curvature of said body, said C-shaped end openings encompassing the axis of said body within their periphery;* said body [is] *being* provided with a plurality of radial ribs and a plurality of longitudinal ribs forming an open latticework[,] and imparting a radial flexibility to said body to assist in ejection of disc-like objects from said holder.

* * * * *